United States Patent [19]

Iizuka et al.

[11] Patent Number: 4,710,839
[45] Date of Patent: Dec. 1, 1987

[54] MAGNETIC DISC CARTRIDGE

[75] Inventors: Michio Iizuka, Saku; Haruo Shiba, Komoro, both of Japan

[73] Assignee: TDK Corporation, Tokyo, Japan

[21] Appl. No.: 803,205

[22] Filed: Nov. 27, 1985

[30] Foreign Application Priority Data

Dec. 5, 1984 [JP] Japan ............................ 59-184867[U]

[51] Int. Cl.⁴ .......................................... G11B 23/033
[52] U.S. Cl. ..................................... 360/133; 206/444
[58] Field of Search ................... 360/133, 86; 206/444; 369/291

[56] References Cited

U.S. PATENT DOCUMENTS 4,208,117  6/1980  Harvey et al. ..................... 206/444
4,482,929 11/1984  Beck et al. ......................... 360/133
4,546,397 10/1985  Asami et al. ....................... 360/133

Primary Examiner—John H. Wolff
Assistant Examiner—Matthew J. Bussan
Attorney, Agent, or Firm—Burgess, Ryan & Wayne

[57] ABSTRACT

A magnetic disc cartridge is composed of a pair of upper and lower case members superimposed one upon the other so as to form a hard case to accommodate a magnetic disc therein. An aperture for access of a read-write head to the magnetic disc extends in a radial direction, which aperture is selectively covered by a shutter. The case has a groove on the peripheral edge thereof to receive a shutter actuation pin. The groove extends across the adjoining surfaces of the two case members and is formed by a wall member extending integrally from one of the two case members towards the other so as to hide a joining line between the two case members.

4 Claims, 10 Drawing Figures

MAGNETIC DISC CARTRIDGE

BACKGROUND OF THE INVENTION

1. Field of the Invention

The present invention is related to a magnetic disc cartridge having a magnetic disc accommodated therein. More particularly, it is related to a hard case structure having a groove for engagement with a shutter actuation pin.

2. Description of the Related Art

The use of a magnetic disc as a memory medium is widely known for a variety of applications, such as a memory unit in an electronic computer. Such a disc is usually accommodated in a casing to enable it to be optionally loaded in a disc drive apparatus or removed therefrom for storage. Two types of casings are available: one, a flexible jacket made of, for example, a vinyl chloride and generally known as a floppy disc; and another, a hard case structure rotatably accommodating the magnetic disc and generally known as a magnetic disc cartridge.

In the known magnetic disc cartridge, the hard case is constituted by a pair of upper and lower hard case members having identical profiles, which are superimposed, one on the other, and joined together. The case is provided with an aperture to enable access of a read-write head to the magnetic disc and a shutter to selectively cover the aperture. The shutter is operated by a shutter actuation pin arranged in the disc drive apparatus, which opens the aperture when the cartridge is loaded in the apparatus. The shutter actuation pin finally comes to rest in a groove provided in the peripheral surface of the cartridge case across the adjoining surfaces of the two case members to lock the shutter in the open position. However, a problem can arise in such a magnetic disc cartridge when the cartridge is being loaded in the disc drive apparatus, in that the shutter actuation pin will catch on the case at the adjoining surfaces of the two case members if the two case members were not exactly superposed during assembly of the cartridge, and the shutter actuation pin may then ride on the lower case member projected or displaced from the upper case member and will not be able to attain its correct position, with the result that the pin will exert pressure on the case and cause the cartridge to bend.

SUMMARY OF THE INVENTION

It is an object of the present invention to provide a magnetic disk cartridge which can solve the above-described problem.

According to the present invention, there is provided a magnetic disc cartridge adapted for use with a magnetic disc drive apparatus having a housing to receive the cartridge, a read-write head and a shutter actuation pin. The magnetic disc cartridge comprises a magnetic disc, a pair of upper and lower case members, superimposed one upon the other, to define a generally flat case for accommodating the magnetic disc therein, the case having a center axis and a peripheral edge, a means for defining an aperture in the case between the center axis and the peripheral edge for access of the read-write head to the magnetic disc, a shutter movably mounted on the case and engageable with the shutter actuation pin to move between a first position in which the shutter closes the aperture and a second position in which the shutter opens the aperture, and a means for defining a groove on the peripheral edge of the case, the groove extending through the case in parallel to the center axis to receive the shutter actuation pin when the shutter is in the second position. The means for defining the groove comprises a wall member extending integrally from one of the upper and lower case members toward the other member so as to hide a joining line between the two case members.

BRIEF DESCRIPTION OF THE DRAWINGS

Other features and object of the present invention will become apparent from the following description of the preferred embodiment in reference to the attached drawings, in which.

DESCRIPTION OF THE PREFERRED EMBODIMENT

Figure 1:
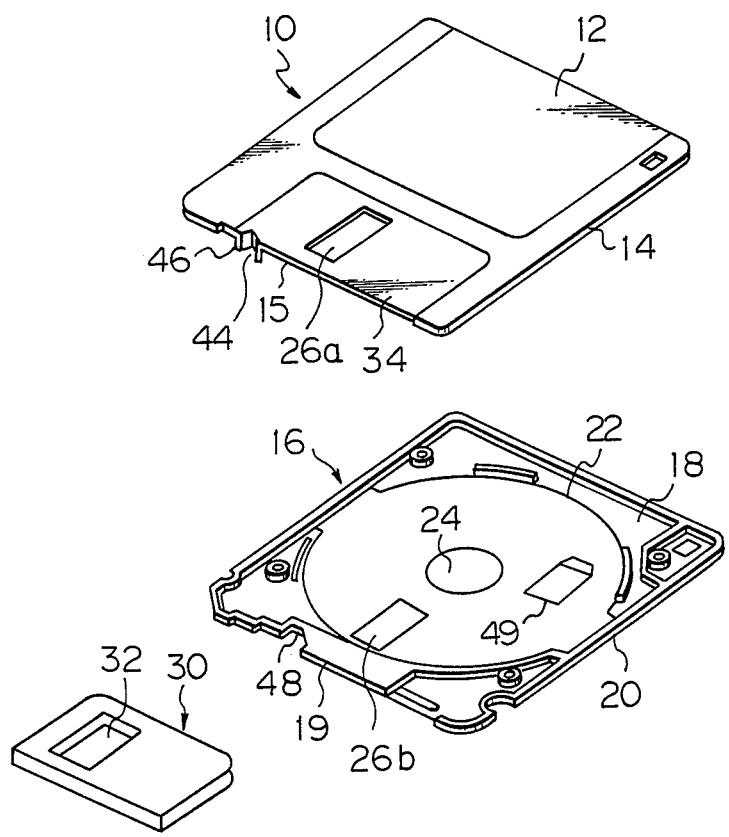
FIG. 1 is an exploded perspective view of a magnetic disc cartridge according to the present invention, with a magnetic disc omitted.
Figure 2:
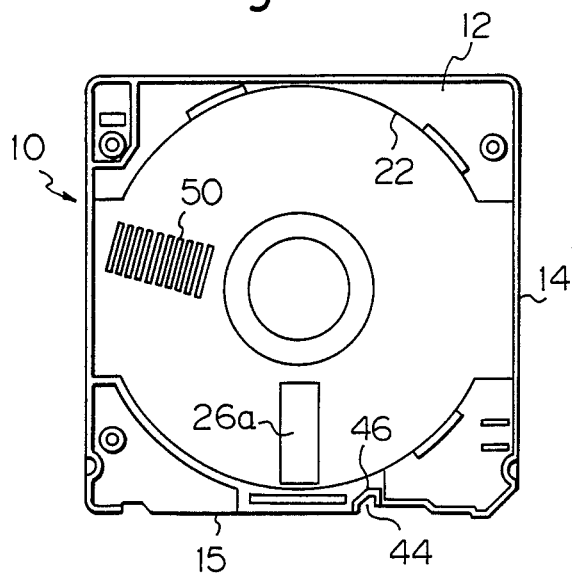
FIG. 2 is an inner plane view of the upper case member in FIG. 1.
Figure 3:
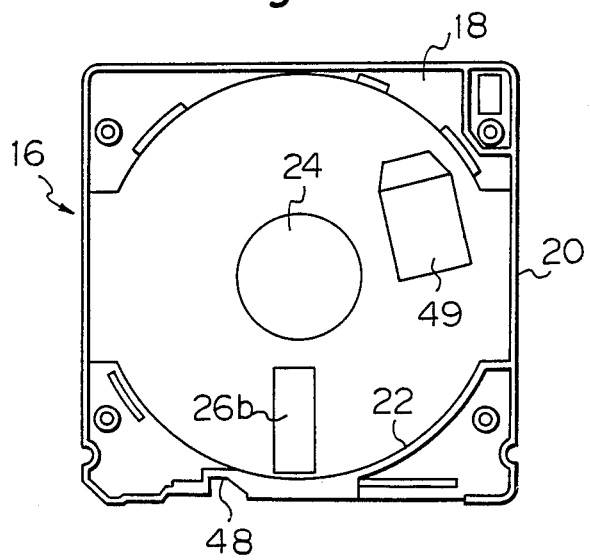
FIG. 3 is a plane view of the lower case member in FIG. 1.
Figure 5:
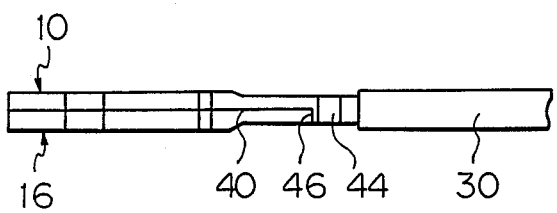
FIG. 5 is a front view of the cartridge after assembly.

Referring to FIGS. 1 and 5, the magnetic disc cartridge comprises an upper hard case member 10, a lower hard case member 16, a magnetic disc (not shown) between the upper and lower case members 10 and 16, and a shutter 30 slidably mounted on the case. The upper and lower case members 10 and 16 are substantially identical in shape and form a substantially flat square case.

Figure 6A:
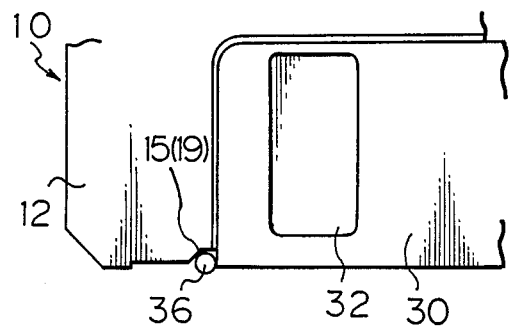
FIGS. 6A to 6C illustrate the shutter opening process.

The upper case member 10 has a top flat wall 12 and a peripheral wall 14 projecting downward around the top wall 12. A portion 15 of the peripheral wall 14 extends substantially straight and is referred to herein as a peripheral edge. The lower case member 16 also has a bottom flat wall 18 and a peripheral wall 20 projecting upward around the bottom wall 18 with a peripheral edge 19. As can be seen, the upper and lower case members 10 and 16 have a circular area 22, respectively, in which the magnetic disc is located. The lower case member 16 further has a central hole 24 allowing an external drive shaft of a magnetic disc drive apparatus (not shown) to pass therethrough and rotationally drive the magnetic disc (not shown). The upper and lower case members 10 and 16 have elongated apertures 26a and 26b extending between the respective peripheral edges 15 and 19 and the center of the members 10 and 16, respectively, to allow access by a read-write head in the magnetic disc drive apparatus to the magnetic disc accommodated in the case. The shutter 30 is mounted on the assembled case over sliding surfaces (only an upper sliding surface 34 can be seen in FIG. 1) along the peripheral edges 15 and 19. The top and bottom of the shutter 30 are provided with openings 32, which expose or cover the elongated apertures 26a and 26b. As will be clear, the shutter 30 moves between a first closed position (FIG. 6A) and a second open position (FIG. 6C).

The shutter 30 is normally biased toward the closed position by a spring (not shown).

Figure 7:
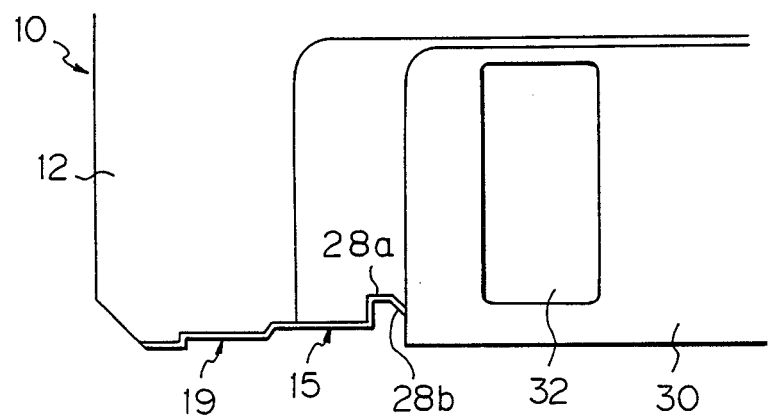
FIG. 7 is a plane view of a prior art cartridge.
Figure 8:
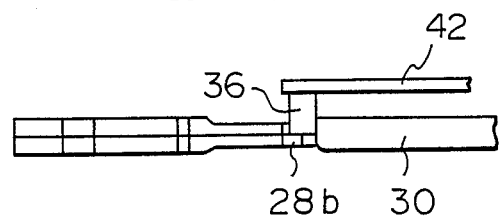
FIG. 8 is a front view of the cartridge in FIG. 7, with the shutter actuation pin caught at the step between the upper and lower case members.

The upper and lower case members 10 and 16 are assembled or superimposed one on the other in an abutment relationship of the peripheral walls 14 and 20 by bonding or screwing, with an internal space remaining therebetween to accommodate the magnetic disc therein. The lower case member 16 has an elastic element 49 and the upper case member 10 has a counter abutment member 50. These members 49 and 50 cause a liner sheet (not shown) on either side of the magnetic disc to press on the disc. The upper and lower case members 10 and 16 also may be provided with means for exactly locating the case members relative to each other so that the outer peripheral surfaces of the resultant case may be smoothly contiguous. Nevertheless, the peripheral surfaces may be displaced from each other during the assembly operation so that the peripheral edge 19 of the lower case member 16 may project from the peripheral edge 15 of the upper case member 10, as seen in FIG. 7. The peripheral edges 15 and 19 in FIG. 7 have identical grooves 28a and 28b, respectively, to receive a shutter actuation pin in the disc drive apparatus. If the grooves 28a and 28b are stepped, the shutter actuation pin 36 supported by an arm 42 may catch on the step, as shown in FIG. 8.

Figure 4:
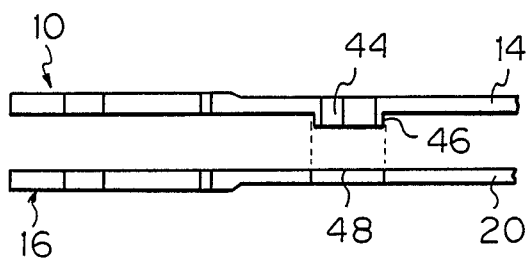
FIG. 4 is a front view of the cartridge before assembly.

According to the present invention, a groove 44 is provided on the peripheral edge 15 of the upper case member 10 at a position in which the groove 44 can receive the shutter actuation pin when the shutter is in the second open position. This groove 44 is formed by a wall portion 46 which integrally extends from the upper case member 10 toward the lower case member 16, which has a recess 48 on the peripheral edge 19 thereof to pass the wall portion 46, as can be seen in FIGS. 4 and 5. It will be clear from FIG. 5 that the wall portion 46 together with the groove 44 extends through the lower case member 16 in parallel to the axis of the case and hide a joining line 40 of adjoining surfaces between the two case members 10 and 16. Therefore, no vertical step is formed in the groove 44 even if the two case members 10 and 16 are assembled with the lower peripheral edge 19 projecting from the upper peripheral edge 15.

A modern magnetic disc drive apparatus is provided with a housing to receive the magnetic disc cartridge, a read-write head accessible to the magnetic disc in the cartridge, and a shutter actuation pin. The magnetic disc cartridge can be horizontally inserted in the housing, with the peripheral edges 15 and 19 directed to the front side. The shutter actuation pin 36, as shown in FIG. 6A, remains stationary in the drive apparatus so that it can engage with the inserted front edge, e.g., the peripheral edges 15 and 19 of the cartridge case and the corner of the shutter 30, which is in the closed position.

Figure 6B:
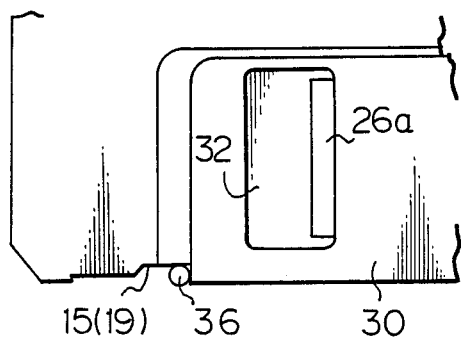
Figure 6C:
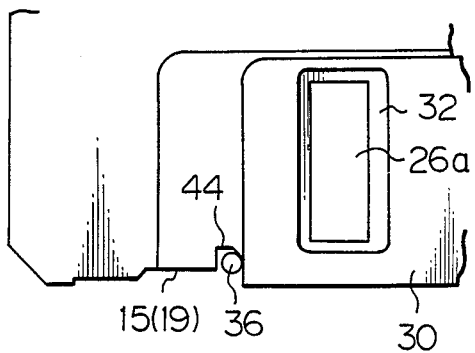

The housing is then horizontally laterally moved together with the cartridge, with the shutter 30 abutted against the stationary shutter actuation pin 36, with the result that a relative movement occurs between the shutter 30 and the case to open the shutter 30 (FIG. 6B). The groove 44 then comes in front of the shutter actuation pin 36, and further insertion of the cartridge causes the shutter actuation pin 36 to rest in the groove 44 (FIG. 6C). It will be appreciated that the shutter 30 completely opens the aperture 26a (and 26b) by its opening 32 when the groove 40 moves in front of the shutter actuation pin 36. Then the housing together with the cartridge is dropped vertically in a direction perpendicular to the sheet of FIG. 6C, and the shutter actuation pin 36 follows this movement. The operation of the magnetic disc drive apparatus is now ready to start. As previously stated, the problem, in the prior art occurred at that vertical movement of the cartridge and the shutter actuation pin 36. As shown in FIG. 8, the shutter actuation pin 36 normally hangs from an arm 42. If the groove 28b of the lower case member 16 projects from the groove 28a of the upper case member 10, as shown in FIGS. 7 and 8, the free bottom edge of the shutter actuation pin 36 may occasionally catch on the step between the grooves 28a and 28b, and further downward force applied to the shutter actuation pin 36 causes the cartridge to bend.

What is claimed is:

1. A magnetic disc cartridge adapted for use with a magnetic disc drive apparatus having a housing to receive said cartridge, a read-write head and a shutter actuation pin, said magnetic disc cartridge comprising a magnetic disc, a pair of upper and lower case members, superimposed one upon the other, to define a generally flat case for accomodating said magnetic disc therein, said case having a center axis and a peripheral wall, said upper and lower case members having peripheral edges which form said peripheral wall, with a seam line formed between said case members and upon said peripheral wall when said case members are superimposed one upon the other, a means for defining an aperture in said case between said center axis and said peripheral wall for access of said read-write head to said magnetic disc, a shutter moveably mounted on said case and engageable with said shutter actuation pin to move between a first position in which said shutter closes said aperture and a second position in which said shutter opens said aperture, and a means for defining a groove on said peripheral wall of said case, said groove extending through the case in parallel to said center axis to receive said shutter actuation pin when said shutter is in said second position, wherein said means for defining said groove comprises a cut-out section in one of said case members along the peripheral edge thereof, and a wall member defining said groove and extending integrally from the other of the upper and lower case members along the peripheral edge thereof, said wall member extending into said cut-out section so that said groove contains no seam line, whereby catching of said shutter actuation pin upon said seam line is precluded.

2. A magnetic disc cartridge according to claim 1, wherein said peripheral wall extends substantially straight and said shutter is slidably mounted on said case along said substantially straight peripheral wall.

3. A magnetic disc cartridge according to claim 2, wherein said shutter is biased by a spring toward said first position and said shutter actuation pin causes said shutter to be moved toward said second position against said spring.

4. A magnetic disc cartridge according to claim 3, wherein said shutter actuation pin slides against said peripheral wall to actuate said shutter between said first and second positions, and said shutter actuation pin rests in said groove when said shutter reaches said second position.

* * * * *